(12) United States Patent
Miyagi et al.

(10) Patent No.: US 12,145,716 B2
(45) Date of Patent: Nov. 19, 2024

(54) DRONE CONTROLLER AND CONTROL PROGRAM

(71) Applicant: NILEWORKS INC., Tokyo (JP)

(72) Inventors: Ryo Miyagi, Tokyo (JP); Chihiro Wake, Tokyo (JP); Hiroshi Yanagishita, Tokyo (JP)

(73) Assignee: NILEWORKS INC., Tokyo (JP)

( * ) Notice: Subject to any disclaimer, the term of this patent is extended or adjusted under 35 U.S.C. 154(b) by 272 days.

(21) Appl. No.: 17/432,242

(22) PCT Filed: Feb. 21, 2020

(86) PCT No.: PCT/JP2020/007224
§ 371 (c)(1),
(2) Date: Aug. 19, 2021

(87) PCT Pub. No.: WO2020/171229
PCT Pub. Date: Aug. 27, 2020

(65) Prior Publication Data
US 2022/0185456 A1    Jun. 16, 2022

(30) Foreign Application Priority Data
Feb. 22, 2019 (JP) ................. 2019-030474

(51) Int. Cl.
*B64C 13/20* (2006.01)
*B64C 13/22* (2006.01)
(Continued)

(52) U.S. Cl.
CPC .............. *B64C 13/22* (2013.01); *B64C 13/20* (2013.01); *B64C 39/024* (2013.01);
(Continued)

(58) Field of Classification Search
CPC ....... B64C 13/22; B64C 13/20; B64C 39/024; G05D 1/0016; G05D 1/0061;
(Continued)

(56) References Cited

U.S. PATENT DOCUMENTS 9,527,605 B1 * 12/2016 Gentry .................... F21S 8/086
11,274,931 B2    3/2022 Hiramatsu
(Continued)

FOREIGN PATENT DOCUMENTS

CN      105518487 A     4/2016
CN      105867181 A     8/2016
(Continued)

OTHER PUBLICATIONS

Japanese Office Action received in corresponding Japanese Application No. 2022-037673 dated Sep. 8, 2022.
(Continued)

*Primary Examiner* — Anne Marie Antonucci
*Assistant Examiner* — Patrick Daniel Mohl
(74) *Attorney, Agent, or Firm* — MATTINGLY & MALUR, PC (57) ABSTRACT

Provided are a controller for controlling a drone that performs autonomous flight under computer control and a control program that runs on a tablet terminal. On a screen of the controller or the program, map information on an agricultural field over which the drone is to fly, route information on a route along which the drone is to fly, and an emergency stop button of the drone are displayed. A button for performing fine adjustment on an altitude may be displayed. It is desirable that the emergency stop button be translucent and be displayed such that the button is superimposed on the map information. It is desirable that emergency stop be performed only when a predetermined operation is performed on the emergency stop button a
(Continued)

predetermined number of times or more within a predetermined time period.

25 Claims, 8 Drawing Sheets

(51) Int. Cl.
    *B64C 39/02* (2023.01)
    *B64U 10/13* (2023.01)
    *G05D 1/00* (2024.01)
    *G08G 5/00* (2006.01)

(52) U.S. Cl.
    CPC ......... *G05D 1/0016* (2013.01); *G05D 1/0061* (2013.01); *G08G 5/0069* (2013.01); *B64U 10/13* (2023.01); *B64U 2201/104* (2023.01); *B64U 2201/20* (2023.01)

(58) Field of Classification Search
    CPC .. G05D 1/0044; G08G 5/0069; G08G 5/0021; G08G 5/0056; B64U 10/13; B64U 2201/104; B64U 2201/20; B64U 2101/00; B64U 50/19; B64U 2101/60; B64D 1/18; G06F 3/0481; G06F 3/0484
See application file for complete search history.

(56) References Cited

U.S. PATENT DOCUMENTS

| | | | | |
|---|---|---|---|---|
| 11,410,562 | B1* | 8/2022 | Mishra | G08G 5/0013 |
| 2016/0284221 | A1* | 9/2016 | Hinkle | G08G 5/0013 |
| 2016/0378113 | A1* | 12/2016 | Bernhardt | G07C 5/0841 701/3 |
| 2017/0004714 | A1* | 1/2017 | Rhee | G08G 5/0056 |
| 2018/0267532 | A1 | 9/2018 | Li et al. | |
| 2018/0321676 | A1* | 11/2018 | Matuszeski | G05D 1/0055 |
| 2019/0332105 | A1* | 10/2019 | Sant | G05D 1/0044 |
| 2020/0018291 | A1* | 1/2020 | Rosen | F03D 80/50 |
| 2020/0202732 | A1 | 6/2020 | Mecklem | G08G 5/0078 |
| 2020/0316628 | A1* | 10/2020 | Odinokov | B64C 39/024 |
| 2021/0080260 | A1* | 3/2021 | Tremblay | G01C 21/30 |

FOREIGN PATENT DOCUMENTS

| | | | |
|---|---|---|---|
| CN | 106774395 | A | 5/2017 |
| JP | 64-23308 | A | 1/1989 |
| JP | 2001-301695 | A | 10/2001 |
| JP | 2004-213480 | A | 7/2004 |
| JP | 2017-144811 | A | 8/2017 |
| JP | 2017-182189 | A | 10/2017 |
| JP | 2017-211734 | A | 11/2017 |
| JP | 2018-43696 | A | 3/2018 |
| JP | 2018-164440 | A | 10/2018 |
| JP | 2018-165852 | A | 10/2018 |
| JP | 2019-008409 | A | 1/2019 |
| KR | 10-2016-0116531 | A | 10/2016 |
| WO | 2017/094842 | A1 | 6/2017 |
| WO | 2017/175804 | A1 | 10/2017 |
| WO | 2017/197316 | A1 | 11/2017 |
| WO | 2018/089694 | A1 | 5/2018 |
| WO | 2018/094661 | A1 | 5/2018 |
| WO | 2018/139024 | A1 | 8/2018 |
| WO | 2019/008745 | A1 | 1/2019 |

OTHER PUBLICATIONS

Japanese Office Action received in corresponding Japanese Application No. 2022-037673 dated Jun. 9, 2022.
Notice of Reasons for Refusal dated Jan. 6, 2022, issued in corresponding Japanese Patent Application No. 2021-502222.
Instruction Manual ver 1.0—Drone Star, 2017. (https://www.dronestar.jp/wp-content/uploads/2017/04/DRONESTAR01_マニュアルvv1.0_20170417.pdf).
International Search Report of PCT/JP2020/007224 dated Apr. 7, 2020.
Japanese Office Action received in corresponding Japanese Application No. 2022-037673 dated Apr. 12, 2023.
Chinese Office Action received in corresponding Chinese Application No. 202080015748.2 dated Jun. 1, 2023.
Chinese Office Action received in corresponding Chinese Application No. 202080015748.2 dated Dec. 6, 2023 with partial translation.

* cited by examiner

DRONE CONTROLLER AND CONTROL PROGRAM

TECHNICAL FIELD

The present invention relates to a controller for an autonomously flying drone and a control program.

BACKGROUND ART

Application of a small helicopter (multicopter) generally called a drone has been progressing. One of important fields of the application is spreading chemical agent, such as agrochemical and liquid fertilizer, over farmland (an agricultural field) (e.g., see Patent Literature 1, Patent Literature 2, and Patent Literature 3). In Japan, where farmlands are narrow as compared with those in Europe and America, using a drone rather than a piloted airplane or helicopter is often suitable.

Thanks to a technology such as a quasi-zenith satellite system and a real time kinematic-global positioning system (RTK-GPS), it is possible to grasp an absolute position of a drone in flight accurately down to several centimeters, thereby enabling autonomous flight with a minimum of manual control and efficient, accurate spreading of chemical agent even in farmland having a narrow, complicated terrain, which is typically seen in Japan.

Even in a case a drone performs autonomous flight, an operation by a human is necessary for an evacuating action in an emergency situation, fine adjustment of an altitude, and the like. However, a conventional controller including a control stick (joystick) (e.g., Non-Patent Literature 1) is suitable for controlling a drone freely but is complicated in its operation as operation means for a drone that performs autonomous flight. A similar problem is shared with a control program that runs on a smartphone or a tablet and includes a GUI emulating a conventional controller. This problem is significant particularly in a case of an agricultural drone because an operator is not a drone expert.

CITATION LIST

Patent Literature

[Patent Literature 1] Japanese Domestic Re-publication of PCT International Application No. 2017/175804
[Patent Literature 2] Japanese Patent Laid-Open No. 2017-144811
[Patent Literature 3] Japanese Domestic Re-publication of PCT International Application No. 2017/094842

Non Patent Literature

[Non Patent Literature 1] Instruction Manual ver 1.0—DRONE STAR (https://www.dronestar.jp/wp-content/uploads/2017/04/DRONESTAR01_
マニュアル v1.0_20170417.pdf)

SUMMARY OF INVENTION

Technical Problem

Provided are a controller for an autonomously flying drone that is easy to operate even for a nonexpert, and a control program.

Solution to Problem

The present invention solves the problem described above by providing a controller for controlling a drone that includes rotary wings driven by a thrust generating section and performs autonomous flight under computer control, wherein an operation screen of the controller includes map information on an agricultural field over which the drone is to fly, route information on a route along which the drone is to fly, and an emergency response button for issuing an instruction to take at least any one of actions to the drone, the actions including hovering and stopping the thrust generating section.

The present invention solves the problem described above by providing the controller according to the paragraph 0008, wherein a current position of the drone is displayed in a map information display region where the map information is displayed.

The present invention solves the problem described above by providing the controller according to the paragraph 0008 or the paragraph 0009, wherein the emergency response button is translucent and is displayed such that the emergency response button is superimposed on a front side of the map information.

The present invention solves the problem described above by providing the controller according to the paragraph 0008, the paragraph 0009, or the paragraph 0010, wherein the emergency response button occupies one fifth or larger of the operation screen.

The present invention solves the problem described above by providing the controller according to the paragraph 0008, the paragraph 0009, the paragraph 0010, or the paragraph 0011, wherein a thrust-generating-section emergency stop instruction is sent when a predetermined operation is performed on the emergency response button a predetermined number of times or more within a predetermined time period.

The present invention solves the problem described above by providing the controller according to the paragraph 0008, the paragraph 0009, the paragraph 0010, the paragraph 0011, or the paragraph 0012, wherein a thrust-generating-section emergency stop instruction is sent when a pressing and holding operation is performed on the emergency response button for a predetermined time period or longer.

The present invention solves the problem described above by providing the controller according to the paragraph 0008, the paragraph 0009, the paragraph 0010, the paragraph 0011, the paragraph 0012, or the paragraph 0013, wherein the emergency response button is arranged at a position at a predetermined or greater distance from an edge of the operation screen.

The present invention solves the problem described above by providing the controller according to the paragraph 0008, the paragraph 0009, the paragraph 0010, the paragraph 0011, the paragraph 0012, the paragraph 0013, or the paragraph 0014, wherein the operation screen further includes a button for adjusting an altitude.

The present invention solves the problem described above by providing the controller according to the paragraph 0008, the paragraph 0009, the paragraph 0010, the paragraph 0011, the paragraph 0012, the paragraph 0013, the paragraph 0014, or the paragraph 0015, wherein the route information includes at least two or more of a route that gives priority to shortening an operating time, a route that gives priority to reducing a battery consumption, and a route that gives priority to uniformizing chemical agent spreading, from which a route to be used is selectable.

The present invention solves the problem described above by providing the controller according to any one of the paragraph 0008, the paragraph 0009, the paragraph 0010, the paragraph 0011, the paragraph 0012, the paragraph 0013, the paragraph 0014, the paragraph 0015, or the paragraph 0016, wherein the operation screen includes an aircraft condition display region that displays a current status of the drone, the current status including any one or more of in preparation for flight, during replenishment with chemical agent, and during takeoff.

The present invention solves the problem described above by providing the controller according to any one of the paragraph 0008, the paragraph 0009, the paragraph 0010, the paragraph 0011, the paragraph 0012, the paragraph 0013, the paragraph 0014, the paragraph 0015, the paragraph 0016, or the paragraph 0017, wherein the operation screen includes a flight condition display region that displays a flight condition including any one or more of a flight time, a coordinate, a flight speed, and an altitude of the drone.

The present invention solves the problem described above by providing the controller according to any one of the paragraph 0008, the paragraph 0009, the paragraph 0010, the paragraph 0011, the paragraph 0012, the paragraph 0013, the paragraph 0014, the paragraph 0015, the paragraph 0016, the paragraph 0017, or the paragraph 0018, wherein the operation screen includes a peripheral equipment state display region that displays a peripheral equipment state including any one or more of a remaining battery capacity, a spreading pump condition, a remaining amount of chemical agent, and a communication condition of the drone.

The present invention solves the problem described above by providing the controller according to any one of the paragraph 0008, the paragraph 0009, the paragraph 0010, the paragraph 0011, the paragraph 0012, the paragraph 0013, the paragraph 0014, the paragraph 0015, the paragraph 0016, the paragraph 0017, the paragraph 0018, or the paragraph 0019, wherein the operation screen displays information concerning a position and a size of an obstacle registered in advance.

The present invention solves the problem described above by providing the controller according to any one of the paragraph 0008, the paragraph 0009, the paragraph 0010, the paragraph 0011, the paragraph 0012, the paragraph 0013, the paragraph 0014, the paragraph 0015, the paragraph 0016, the paragraph 0017, the paragraph 0018, the paragraph 0019, or the paragraph 0020, further including: a position detection section that detects a position of the controller; and an agricultural field selection screen that is displayed before a transition from a screen to the operation screen is made and on which a specific agricultural field is selected from a plurality of agricultural fields, wherein the controller prohibits selection of an agricultural field at a predetermined or greater distance from a position detected by the position detection section or displays a warning when an agricultural field at the predetermined or greater distance is selected.

The present invention solves the problem described above by providing a program for controlling a drone that includes rotary wings driven by a thrust generating section and performs autonomous flight under computer control, the program including: a command to display map information on an agricultural field over which the drone is to fly, a command to display route information on a route along which the drone is to fly, and a command to display an emergency response button for issuing an instruction to take at least any one of actions to the drone, the actions including hovering and stopping the thrust generating section.

The present invention solves the problem described above by providing the program according to the paragraph 0022, the program including a command to display a current position of the drone in a map information display region where the map information is displayed.

The present invention solves the problem described above by providing the program according to the paragraph 0022 or the paragraph 0023, the program including: a command to display the emergency response button such that the emergency response button is translucent; and a command to display the emergency stop button such that the emergency stop button is superimposed on a front side of the map information.

The present invention solves the problem described above by providing the program according to the paragraph 0022, the paragraph 0023, or the paragraph 0024, wherein the emergency response button occupies one fifth or larger of a screen.

The present invention solves the problem described above by providing the program according to the paragraph 0022, the paragraph 0023, the paragraph 0024, or the paragraph 0025, the program including a command to send a thrust-generating-section emergency stop instruction when a predetermined operation is performed on the response button a predetermined number of times or more within a predetermined time period.

The present invention solves the problem described above by providing the program according to the paragraph 0022, the paragraph 0023, the paragraph 0024, the paragraph, 0025, or the paragraph 0026, the program including a command to send a thrust-generating-section emergency stop instruction when a pressing and holding operation is performed on the emergency response button for a predetermined time period or longer.

The present invention solves the problem described above by providing the program according to the paragraph 0022, the paragraph 0023, the paragraph 0024, the paragraph 0025, the paragraph 0026, or the paragraph 0027, the program including a command to arrange the emergency response button at a position at a predetermined or greater distance from an edge of a screen.

The present invention solves the problem described above by providing the program according to the paragraph 0022, the paragraph 0023, the paragraph 0024, the paragraph 0025, the paragraph 0026, the paragraph 0027, or the paragraph 0028, the program further including a command to display a button for adjusting an altitude.

The present invention solves the problem described above by providing the program according to the paragraph 0022, the paragraph 0023, the paragraph 0024, the paragraph 0025, the paragraph 0026, the paragraph 0027, the paragraph 0028, or the paragraph 0029, wherein the route information includes at least two or more of a route that gives priority to shortening an operating time, a route that gives priority to reducing a battery consumption, and a route that gives priority to uniformizing chemical agent spreading, and the program includes a command to prompt a user to select a route to be used.

The present invention solves the problem described above by providing the program according to any one of the paragraph 0022, the paragraph 0023, the paragraph 0024, the paragraph 0025, the paragraph 0026, the paragraph 0027, the paragraph 0028, the paragraph 0029, or the paragraph 0030, the program including a command to display an aircraft condition display region that displays a current status of the drone, the current status including any one or more of in preparation for flight, during replenishment with chemical agent, and during takeoff.

The present invention solves the problem described above by providing the program according to any one of the paragraph 0022, the paragraph 0023, the paragraph 0024, the paragraph 0025, the paragraph 0026, the paragraph 0027, the paragraph 0028, the paragraph 0029, the paragraph 0030, or the paragraph 0031, the program including a command to display a flight condition display region that displays a flight condition including any one or more of a flight time, a coordinate, a flight speed, and an altitude of the drone.

The present invention solves the problem described above by providing the program according to any one of the paragraph 0022, the paragraph 0023, the paragraph 0024, the paragraph 0025, the paragraph 0026, the paragraph 0027, the paragraph 0028, the paragraph 0029, the paragraph 0030, the paragraph 0031, or the paragraph 0032, the program including a command to display a peripheral equipment state display region that displays a peripheral equipment state including any one or more of a remaining battery capacity, a spreading pump condition, a remaining amount of chemical agent, and a communication condition of the drone.

The present invention solves the problem described above by providing the program according to any one of the paragraph 0022, the paragraph 0023, the paragraph 0024, the paragraph 0025, the paragraph 0026, the paragraph 0027, the paragraph 0028, the paragraph 0029, the paragraph 0030, the paragraph 0031, the paragraph 0032, or the paragraph 0033, the program including a command to display information concerning a position and a size of an obstacle registered in advance.

The present invention solves the problem described above by providing the program according to any one of the paragraph 0022, the paragraph 0023, the paragraph 0024, the paragraph 0025, the paragraph 0026, the paragraph 0027, the paragraph 0028, the paragraph 0029, the paragraph 0030, the paragraph 0031, the paragraph 0032, the paragraph 0033, or the paragraph 0034, the program including:

a command to display, before a transition from a screen to the operation screen is made, an agricultural field selection screen on which a specific agricultural field is selected from a plurality of agricultural fields; and a command to prohibit selection of an agricultural field at a predetermined or greater distance from a position detected by a position detection section or to display a warning when an agricultural field at the predetermined or greater distance is selected.

Advantageous Effects of Invention

A controller for an autonomously flying drone that is easy to operate even for a nonexpert, and a control program are provided.

DESCRIPTION OF EMBODIMENT

An embodiment for carrying out the present invention will be described below with reference to the drawings. The drawings are all for exemplification purposes. In a detailed description to be made below, specific details will be described for explanation and for helping complete understanding of a disclosed embodiment. However, embodiments are not limited to these specific details. In addition, well-known structures and devices are illustrated schematically for simplification of the drawings.

First, a configuration of a drone according to the present invention will be described. In the present specification, a drone generally refers to an aerial vehicle including a plurality of rotary wings irrespective of its type of motive power (electric motor or engine, etc.) and its type of control (wireless or wired, etc.)

As illustrated in FIG. 1 to FIG. 5, rotary wings (101-1a, 101-1b, 101-2a, 101-2b, 101-3a, 101-3b, 101-4a, and 101-4b) (also referred to as rotors) are means for causing a drone (100) to fly, and eight rotary wings (four sets of double-tier rotary wings) are desirably provided, with consideration given to balance of stability of flight, a size of an airframe, and power consumption. The rotary wings (101) are desirably arranged at positions in four directions from a main body (110) of a drone (100), supported by arms extending from the main body (110). That is, as viewed in a traveling direction, the rotary wings (101-1a) and (101-1b) are desirably arranged behind the main body (110) on the left, the rotary wings (101-2a and 101-2b) are desirably arranged ahead of the main body (110) on the left, the rotary wings (101-3a and 101-3b) are desirably arranged behind the main body (110) on the right, and the rotary wings (101-4a and 101-4b) are desirably arranged ahead of the main body (110) on the right. Note that a traveling direction of the drone (100) is a downward direction of the paper of FIG. 1. Rod-shaped legs (107-1, 107-2, 107-3, and 107-4) extend downward from rotation axes of the rotary wings (101).

Figure 1:
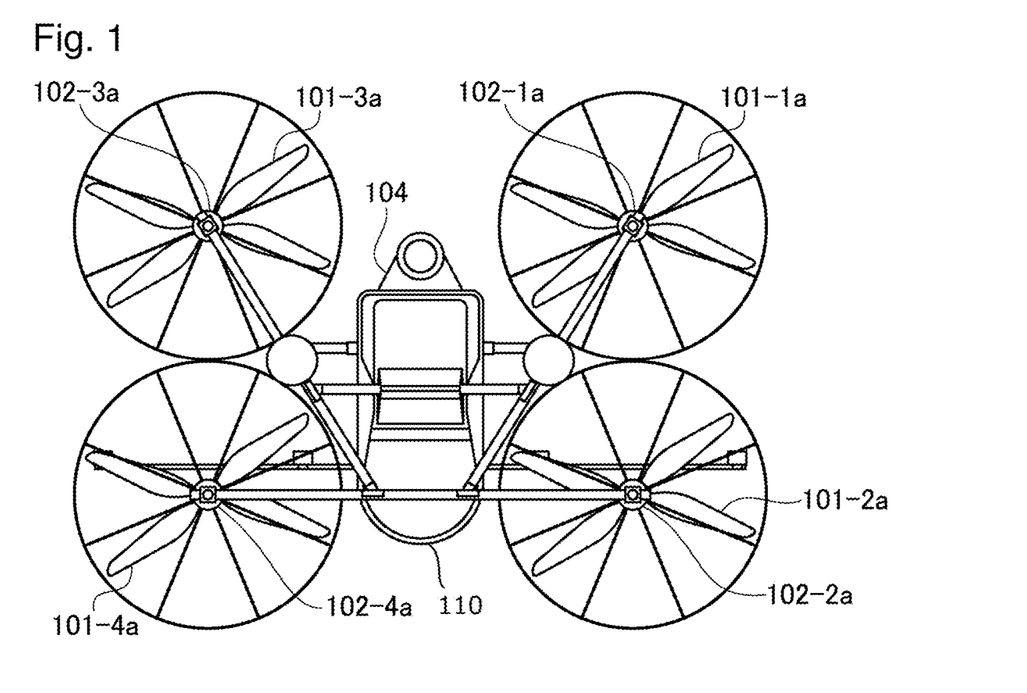
FIG. 1 is a plan view of a drone included in a drone system according to the present invention.
Figure 2:
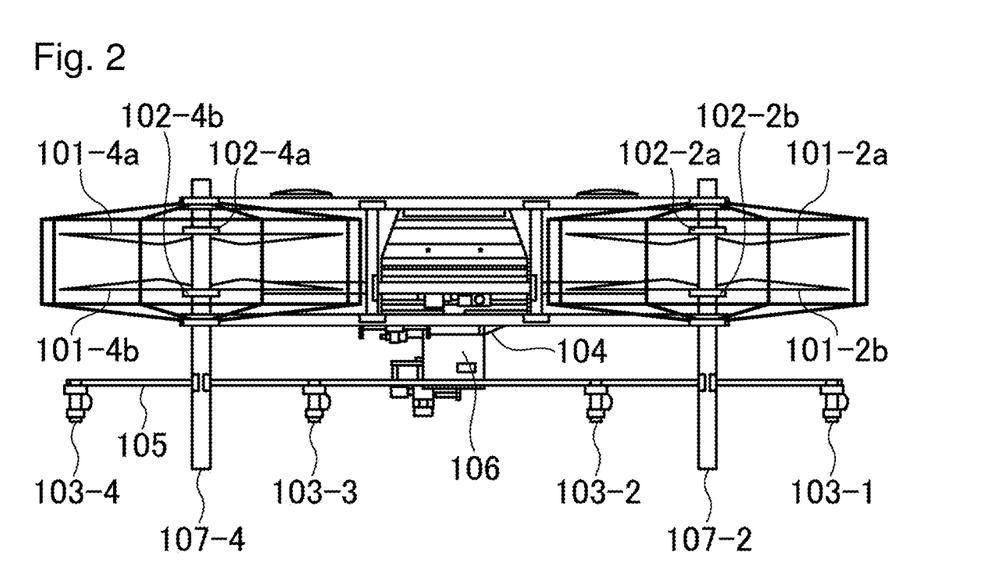
FIG. 2 is a front view of a drone included in the drone system.
Figure 3:
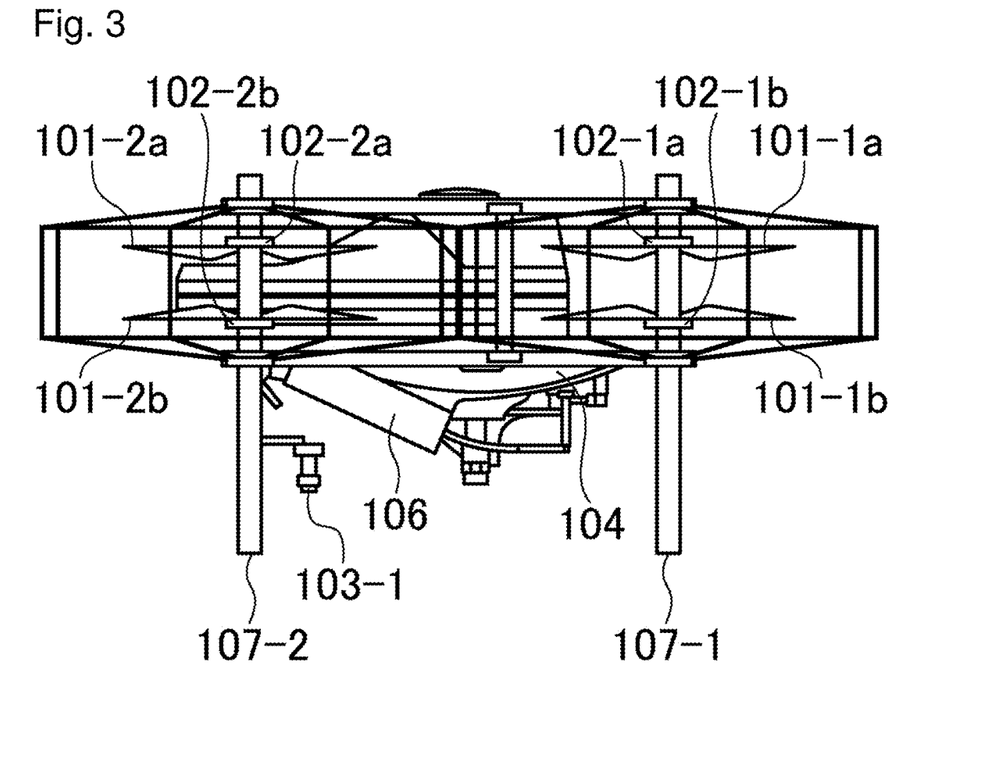
FIG. 3 is a right side view of the drone.
Figure 4:
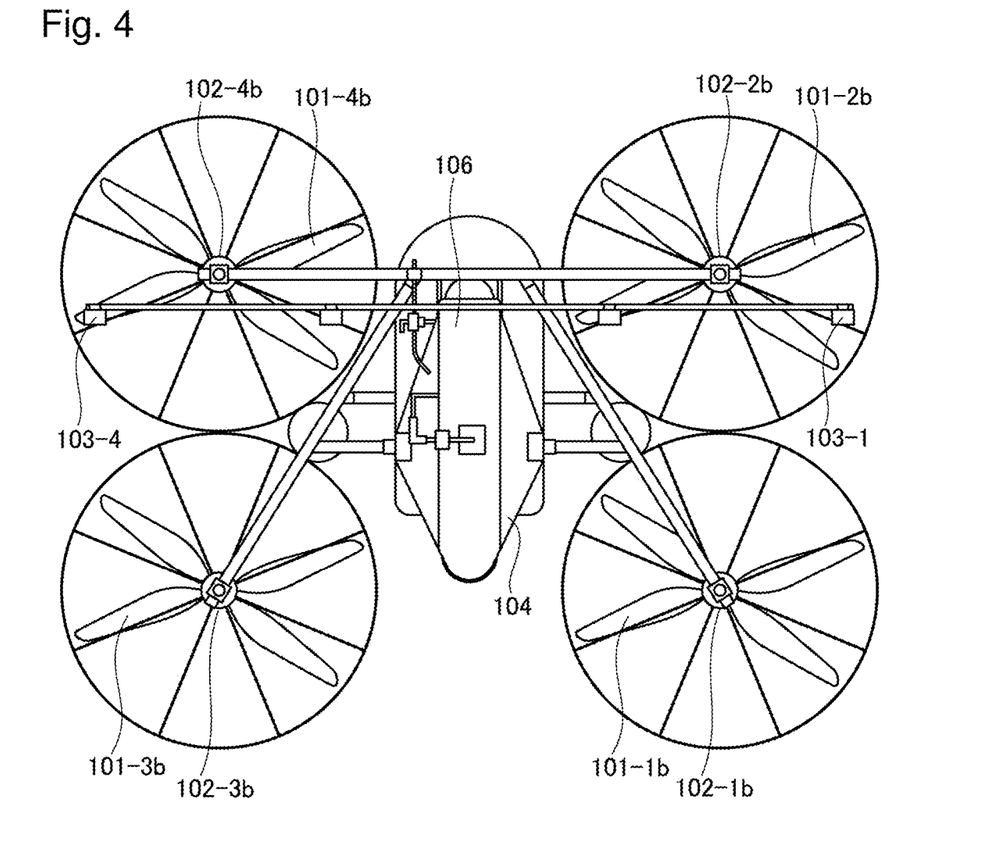
FIG. 4 is a rear view of the drone.
Figure 5:
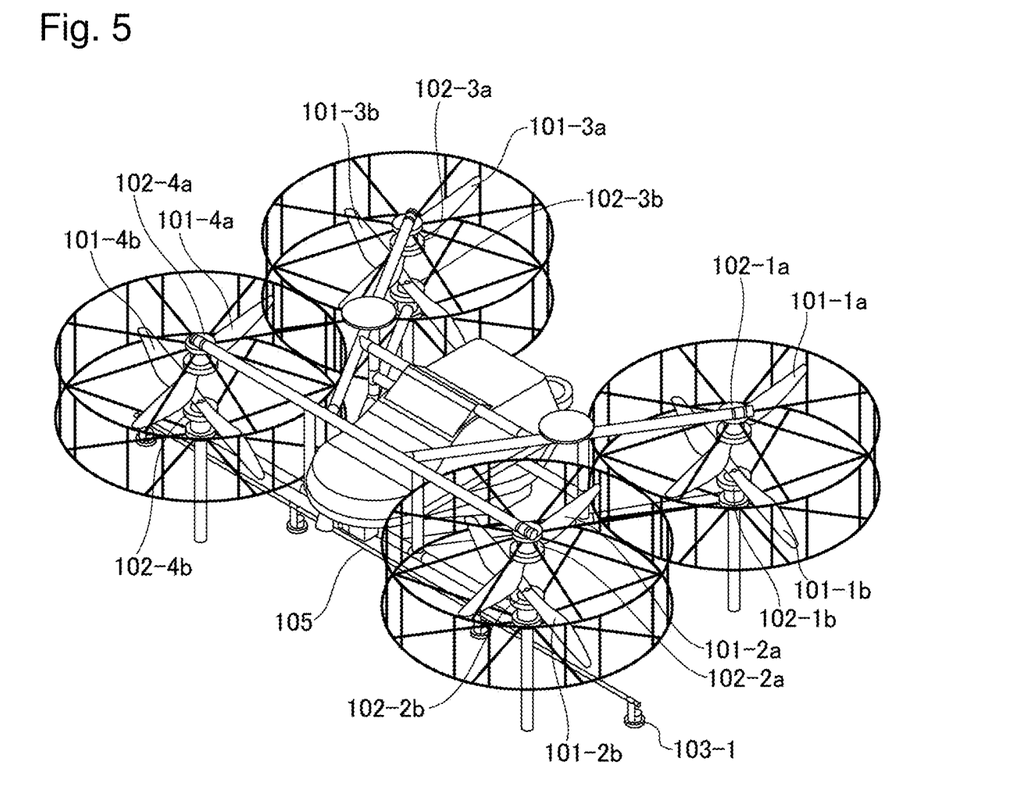
FIG. 5 is a perspective view of the drone.

Motors (102-1a, 102-1b, 102-2a, 102-2b, 102-3a, 102-3b, 102-4a, and 102-4b) are means for causing the rotary wings (101-1a, 101-1b, 101-2a, 101-2b, 101-3a, 101-3b, 101-4a, and 101-4b) to rotate (typically electric motors but may be engines, etc.), respectively, and are each provided for one rotary wing. The motors (102) exemplify thrusters. Up and down rotary wings of one of the sets (e.g., 101-1a and 101-1b) and their respective motors (e.g., 102-1a and 102-1b) desirably include axes lying on the same line and rotate in directions opposite to each other for stability of flight of the drone and the like. As illustrated in FIG. 2 and FIG. 3, radial members for supporting propeller guards, which are provided to prevent the rotors from interfering with a foreign object, each desirably have a turreted structure rather than a flat structure. This is because, in a case of a collision, this structure urges the member to buckle outward of the rotary wing, preventing the member from interfering with the rotary wing.

Chemical agent nozzles (103-1, 103-2, 103-3, and 103-4) are means for spreading chemical agent downward, and the number of the provided chemical agent nozzles is desirably four. Note that, in the present specification, a chemical agent generally refers to liquid or powder to be spread over an agricultural field, such as agrochemical, herbicide, liquid fertilizer, insecticide, seeds, and water.

A chemical agent tank (104) is a tank for storing chemical agent to be spread and is desirably provided at a position close to and below a center of gravity of the drone (100), from a viewpoint of weight balance. Chemical agent hoses (105-1, 105-2, 105-3, and 105-4) are means for connecting the chemical agent tank (104) and the chemical agent nozzles (103-1, 103-2, 103-3, and 103-4), are made of a hard material, and may additionally play a role of supporting the chemical agent nozzles. A pump (106) is means for discharging the chemical agent from the nozzles.

Figure 6:
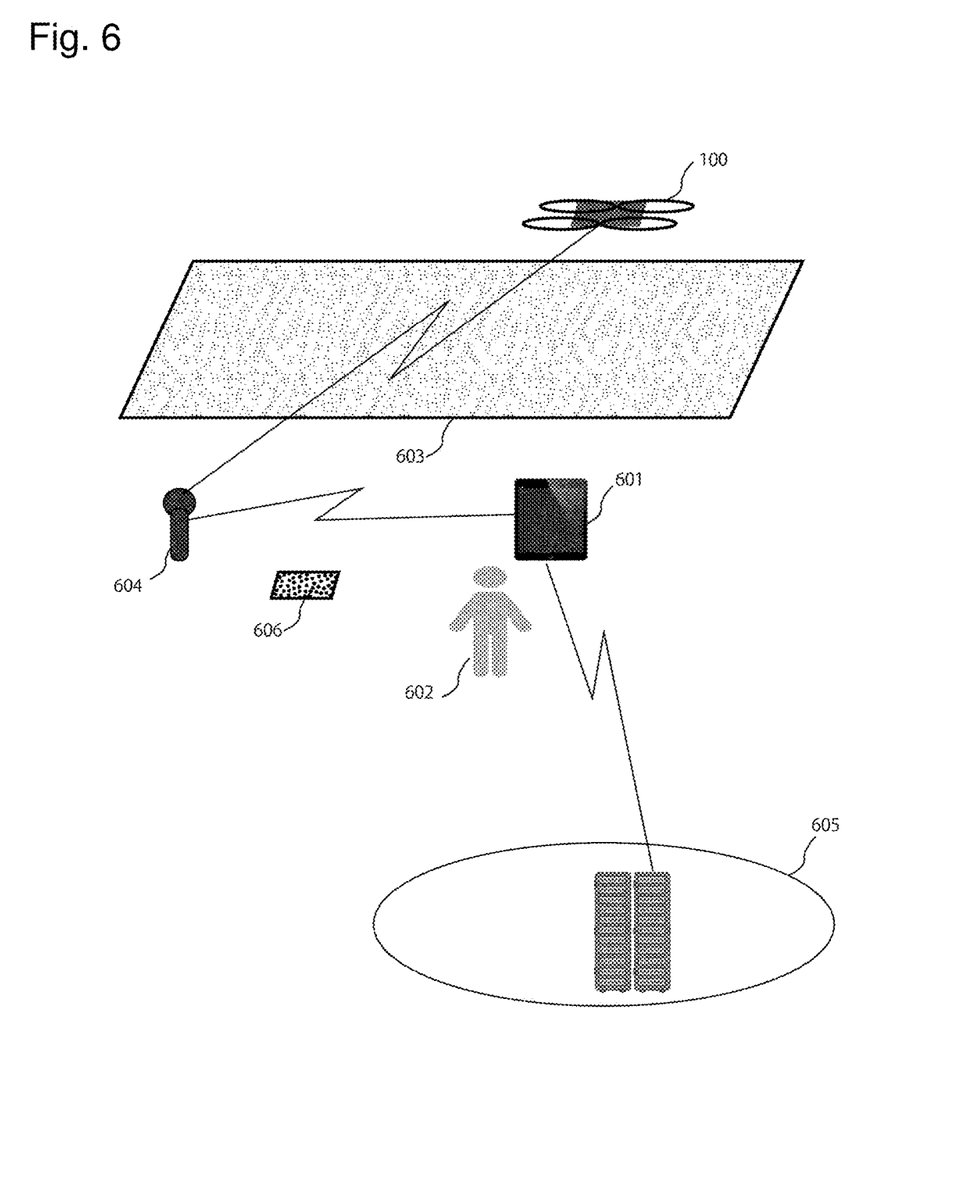
FIG. 6 is a general schematic diagram of a chemical-agent spreading system included in the drone.

FIG. 6 illustrates a general schematic diagram of a system to which an embodiment of the drone (100) according to the present invention in chemical agent spreading use is applied. This figure is schematic, and its scale is not exact. In this figure, the drone (100), a controller (601), and a base station (604) are connected to an agriculture cloud (605). These connections may be implemented by wireless communication such as Wi-Fi and a mobile telecommunications system or may be partly or entirely implemented in a form of wired connection.

The controller (601) is means for sending an instruction to the drone (600) in response to an operation made by a user (602) and for displaying information received from the drone (600) (e.g., position, amount of chemical agent, remaining battery capacity, image taken by a camera, etc.) and is desirably implemented in a form of mobile information equipment such as a typical tablet terminal on which a computer program runs. The drone (100) according to the present invention is controlled so as to perform autonomous flight and is desirably configured to allow manual operation in basic operations such as a takeoff and a return and in an emergency situation. In addition to the mobile information equipment, an emergency controller (not illustrated) having a dedicated function of making an emergency stop may be used. The emergency controller may be dedicated equipment provided with a large emergency stop button or the like for dealing speedily with an emergency situation.

An agricultural field (603) is a rice field, field, or the like that is to be spread with the chemical agent by the drone (100). In reality, topographic features of the agricultural field (603) are complex, and there is a case where no topographic map is available in advance or a case where a given topographic map disagrees with site conditions of the agricultural field (603). Usually, the agricultural field (603) is adjacent to a house, hospital, school, agricultural field of another crop, road, railroad, or the like. In the agricultural field (603), obstacles such as a building, an electric wire, or the like may be present.

The base station 604 is a device providing a host unit function in Wi-Fi communication and the like and is desirably configured to function also as an RTK-GPS base station to provide an accurate position of the drone (100) (the host unit function in the Wi-Fi communication and the RTK-GPS base station may be implemented in independent devices). The base station (604) may be capable of communicating mutually with the agriculture cloud (605) using a mobile telecommunications system such as 3G, 4G, and LTE.

The agriculture cloud (605) typically includes computers and relevant software operated on a cloud computing service and may be wirelessly connected to the controller (601) over a mobile telephone line or the like. The agriculture cloud (605) may analyze images of the agricultural field (603) captured by the drone (100), grasp growth conditions of a crop, and perform processing for determining a flight route. In addition, the agriculture cloud (605) may provide topographic information and the like on the agricultural field (603) stored therein to the drone (100). Moreover, the agriculture cloud (605) may accumulate records of flight routes of the drone (100) and images captured by the drone (100) and perform various kinds of analyses thereon.

In general, the drone (100) takes off from the takeoff-landing point (606) located outside the agricultural field (603), spreads the chemical agent over the agricultural field (603), and returns to the takeoff-landing point (606) after the spreading or when replenishment with the chemical agent, electric recharging, or the like is needed. A flight route (entrance route) from the takeoff-landing point (606) to the agricultural field (603) as a destination may be stored in advance in the agriculture cloud (605) or the like or may be input by the user (602) before a takeoff.

Figure 7:
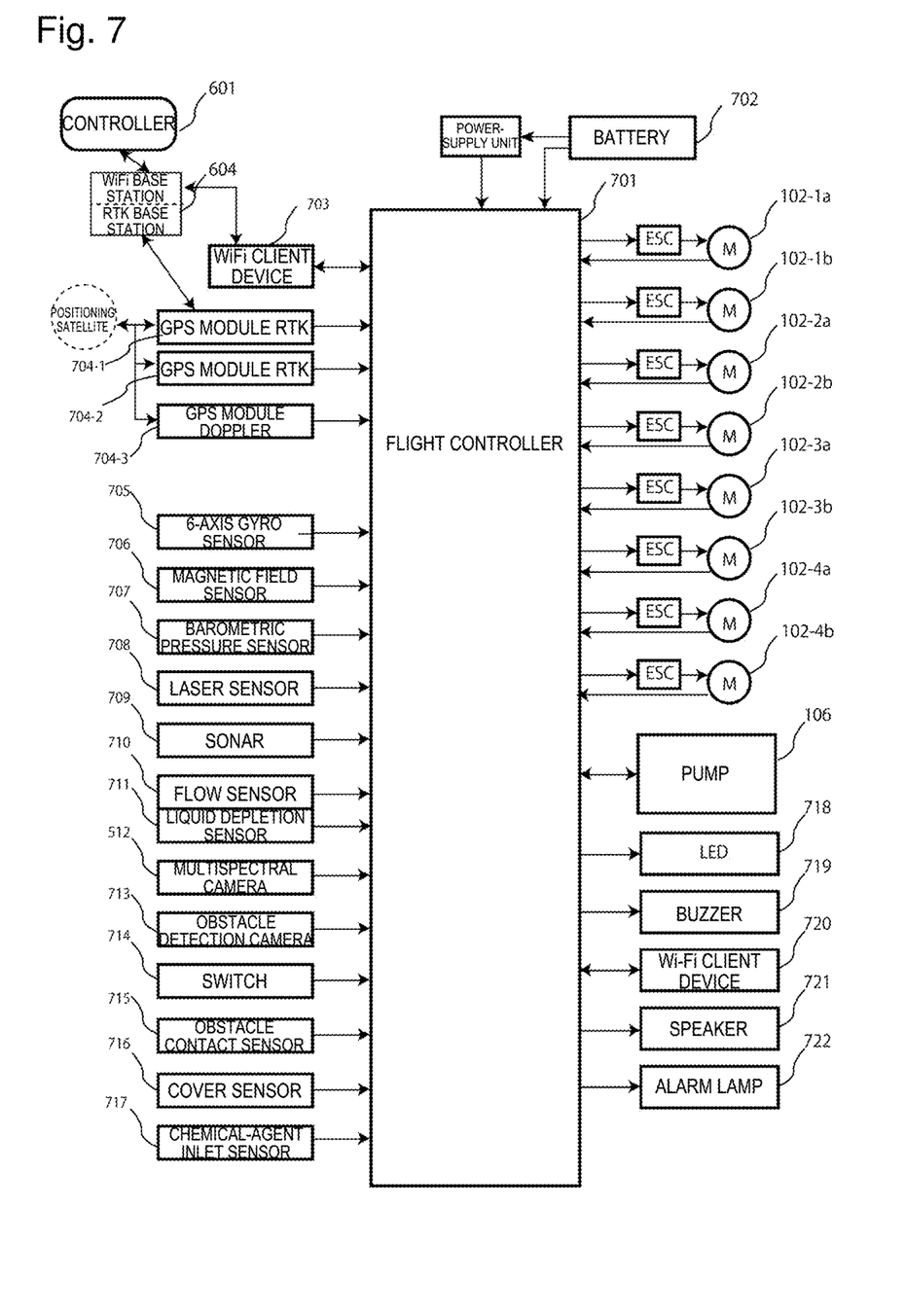
FIG. 7 is a schematic diagram illustrating control functions of the drone.

FIG. 7 is a block diagram illustrating control functions in an embodiment of a drone for spreading a chemical agent according to the present invention. A flight controller (701) is a constituent component that governs control of the entire drone; specifically, the flight controller (701) may be an embedded computer including a CPU, a memory, relevant software, and the like. The flight controller (701) controls a flight of a drone (100) by controlling the numbers of revolutions of the motors (102-1a, 102-1b, 102-2a, 102-2b, 102-3a, 102-3b, 104-a, and 104-b) via control means such as an electronic speed control (ESC) based on input information received from the controller (601) and input information obtained from various kinds of sensors described later. The flight controller (701) is desirably configured to receive feedback on actual numbers of revolutions of the motors (102-1a, 102-1b, 102-2a, 102-2b, 102-3a, 102-3b, 104-a, and 104-b) so as to monitor whether their rotations are normal. Alternatively, the flight controller (701) may be configured to receive feedback on the rotations of the rotary wings (101) from optical sensors or the like provided at the rotary wings (101).

Software used for the flight controller (701) is desirably capable of being rewritten for enhancement/modification of a function, fixing a problem, or the like via a storage medium or the like or communication means such as Wi-Fi communication and USB. In this case, the software is protected by means of encryption, checksum, digital signature, virus-check software, and the like so as not to be rewritten by fraudulent software. In addition, calculation processing used by the flight controller (701) for the control may be partly executed by another computer that is present on the controller (601) or the agriculture cloud (605) or at another location. Some or all of the constituent components of the flight controller (701) may be duplexed owing to its great importance.

The flight controller (701) can receive a necessary instruction from the controller (601) and send necessary information to the controller (601) by communicating with the controller (601) via a Wi-Fi client unit function (703) and additionally the base station (604). In this case, the communication may be encrypted to prevent fraudulent activities such as interception, spoofing, and hacking a device. The base station (604) has a communication function using Wi-Fi as well as a function of an RTK-GPS base station. By combining a signal from the RTK base station and signals from GPS satellites, an absolute position of the drone (100) can be measured with a precision of about several centimeters by the flight controller (701). The flight controller (701) may be duplexed/multiplexed owing to its great importance; in addition, redundant flight controllers (701) may be controlled to use another GPS satellite so as to prepare for failure of some GPS satellite.

A 6-axis gyro sensor (705) is means for measuring accelerations of the drone airframe in three directions orthogonal to one another and further means for calculating velocities by integrating the accelerations. The 6-axis gyro sensor (705) is means for measuring changes in attitude angles, namely, angular velocities, of the drone airframe in the three directions described above. A geomagnetic sensor (706) is means for measuring a direction of the drone airframe by measuring the Earth's magnetic field. A barometric pressure sensor (707) is means for measuring barometric pressure; the barometric pressure sensor (707) can also measure an altitude of the drone indirectly. A laser sensor (708) is means for measuring a distance between the drone airframe and the Earth's surface by using reflection of laser light; the laser sensor (708) may use infrared (IR) laser. A sonar (709) is means for measuring a distance between the drone airframe and the Earth's surface by using reflection of a sound wave such as an ultrasonic wave. These sensors and the like may be selected in accordance with a cost target and performance requirements of the drone. In addition, a gyro sensor (angular velocity sensor) for measuring an inclination of the airframe, an anemometer sensor for measuring a force of wind, and the like may be added. These sensors and the like may be duplexed or multiplexed. In a case where there are a plurality of sensors provided for the same purpose, the flight controller (701) may use only one of the sensors, and if a failure occurs in the one, another one of the sensors may be switched to and used as an alternative sensor. Alternatively, the flight controller (701) may use the plurality of sensors simultaneously, and if measurement results from the sensors disagree, the flight controller (701) may deem that a failure has occurred.

Flow sensors (710) are means for measuring flow rates of chemical agent and are provided at a plurality of locations on channels from the chemical agent tank (104) to the chemical agent nozzles (103). A liquid depletion sensor (711) is a sensor for sensing whether a chemical agent amount has fallen to or below a predetermined amount. A multispectral camera (712) is means for capturing an image of the agricultural field (603) to acquire data to be used for image analysis. An obstacle detection camera (713) is a camera for detecting an intruder for the drone; the obstacle detection camera (713) is desirably a device of a different kind from that of the multispectral camera (712) because its image properties and an orientation of its lens are different from those of the multispectral camera (712). A switch (714) is means with which the user (402) of the drone (100) makes various settings. An obstacle contact sensor (715) is a sensor for detecting that the drone (100), particularly a portion of its rotor or its propeller guard has come into contact with an obstacle such as an electric wire, a building, a human body, a tree, a bird, or another drone. Note that the 6-axis gyro sensor (705) may substitute for the contact sensor (715). A cover sensor (716) is a sensor for detecting that a cover of an operation panel or a cover for an internal maintenance of the drone 100 is in an open state. A chemical-agent inlet sensor (717) is a sensor for detecting that an inlet of the chemical agent tank (104) is in an open state. These sensors and the like may be selected in accordance with a cost target and performance requirements of the drone and may be duplexed or multiplexed. In addition, a sensor may be provided in the base station (604), the controller (601), or another location outside of the drone (100), and information read by the sensor may be sent to the drone. For example, an anemometer sensor may be provided in the base station (604), and information concerning a force and a direction of wind may be sent to the drone (100) via Wi-Fi communication.

The flight controller (701) sends a control signal to the pump (106) to adjust a chemical agent amount to be discharged or stop discharging the chemical agent. The flight controller (701) is desirably configured to receive feedback on current conditions (e.g., the number of revolutions) of the pump (106).

An LED (718) is display means for informing an operator of the drone of a state of the drone. In place of or in addition to the LED, display means such as a liquid crystal display may be used. A buzzer (719) is output means for indicating the state (particularly an error state) of the drone using an aural signal. A Wi-Fi client unit function (720) is an optional constituent component that communicates with an external computer or the like to transfer, for example, software separately from the controller (601). In place of or in addition to the Wi-Fi client unit function, other kinds of wireless communication means such as infrared communication, Bluetooth®, ZigBee® and NFC, or wired communication means such as USB connection may be used. In place of the Wi-Fi client unit function, a mobile telecommunications system such as 3G, 4G, and LTE may be used to enable the mutual communication. A speaker (721) is output means for indicating the state (particularly an error state) of the drone using recorded human voice, synthesized voice, or the like. In some weather conditions, a visual display by the drone (100) during flight is difficult to see; in this case, using voice to transmit the state is effective. An alarm lamp (722) is display means such as a strobe light for indicating the state (particularly an error state) of the drone. These kinds of input/output means may be selected in accordance with a cost target and performance requirements of the drone and may be duplexed or multiplexed.

Figure 8:
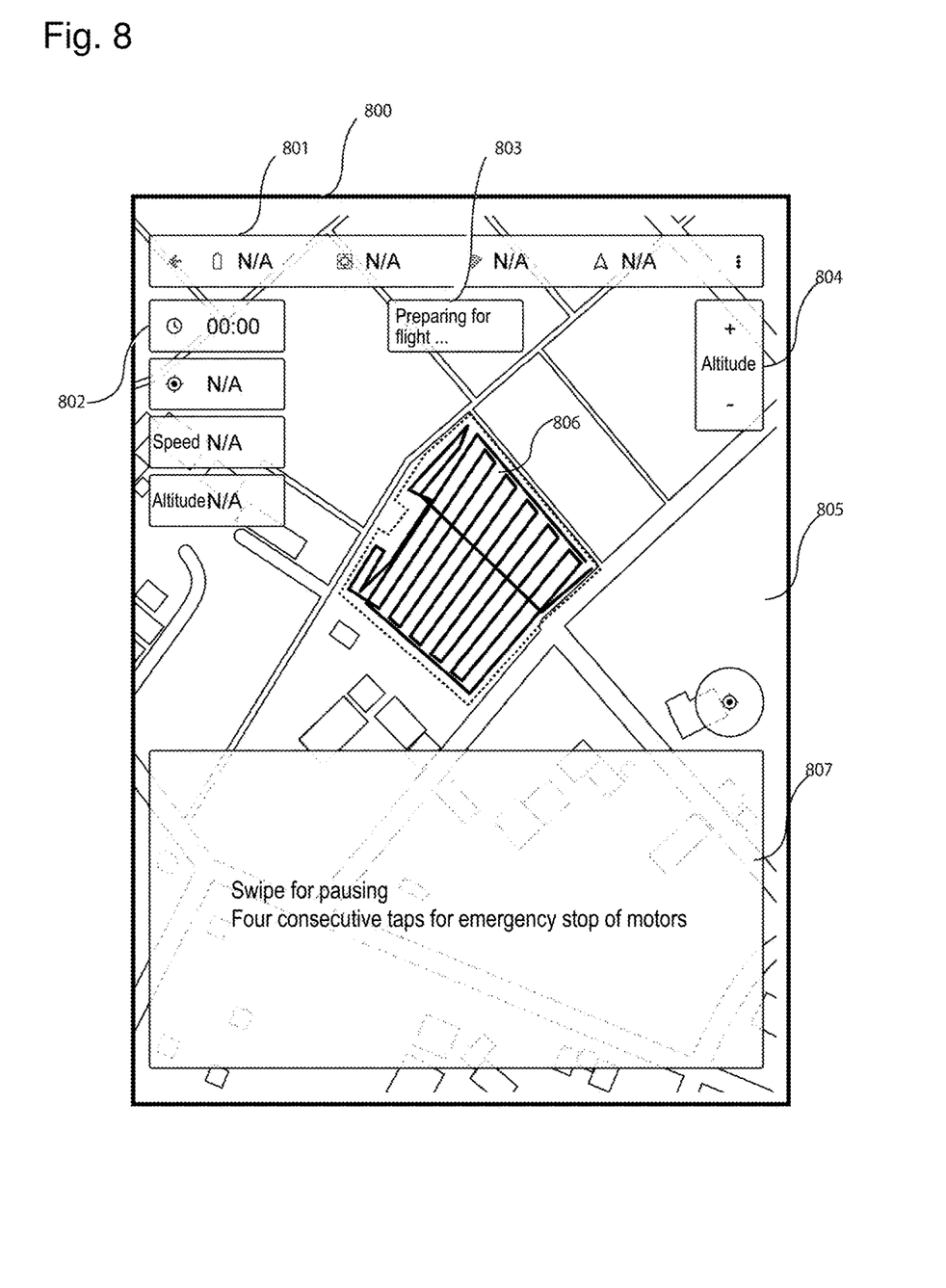
FIG. 8 is a schematic diagram illustrating a screen of a controller for the drone.

FIG. 8 illustrates an embodiment of a main screen (800) of the drone controller (601) according to the present invention. The drone controller according to the present invention is desirably implemented by a computer program that runs on a smartphone or a tablet terminal. On the main screen (800), an image of a certain agricultural field is displayed, and it is desirable to display, before the screen is displayed, a menu screen for making a selection from a plurality of agricultural fields under management of a user (604). In this case, it is desirable to prevent an erroneous selection of an agricultural field by grasping a current position with a position detection section (GPS, etc.) included in the controller (601) and by means of allowing only an agricultural field that is sufficiently close to the current position to be selected (e.g., prohibiting a selection of an agricultural field at a predetermined or greater distance from the current position), by means of displaying a warning message when an agricultural field at a predetermined or greater distance from the current position is selected, or the like.

The main screen (800) is desirably provided with a peripheral equipment state display region (801), a flight condition display region (802), an aircraft condition display region (803), altitude adjustment input means (804), a map display region (805), a route information display region (806), and an emergency response button (807). Functions other than the above, for example, a function equivalent to a control stick, is desirably not displayed on the main screen (800). This is to avoid unnecessary misoperation because the user is nonexpert.

The peripheral equipment state display region (801) displays a remaining battery capacity, a pump condition, a remaining amount of chemical agent, a communication condition, a GPS reception condition, and the like of the drone (100). It is desirable to simplify information as much as possible and to inform an operator of a situation of higher importance reliably by using a different color in a case of an error.

The flight condition display region (802) displays at least one of a flight time, GPS coordinates, a flight speed, an altitude, and the like of the drone (100). In addition, a progress bar (not illustrated) for indicating a completion status of chemical agent spreading may be displayed.

The aircraft condition display region (803) displays at least one of current statuses of the drone (100) such as in preparation for flight, during replenishment with chemical agent, during takeoff, during flight, and during emergency evacuation. In addition, a notice of the next operation or a request for an action to a user (e.g., "Please be ready for chemical agent replenishment") may be displayed.

The altitude adjustment input means (804) is user-interface inputting means that is implemented with, for example, a button for increasing and decreasing a current altitude of the drone (100). This is because, although the drone (100) according to the present invention performs autonomous flight in principle, where an altitude of the drone (100) is automatically adjusted by a computer program, there can be a case where an operator wants to make a fine adjustment to the altitude in accordance with a height of a crop or the like.

The map display region (805) shows a map including an agricultural field to be spread with chemical agent; the map may be an aerial photograph, a topographic map, or a display made by superimposing them. It is desirable that a scale and a position of the map be adjustable by a gesture operation or the like. On the map display region (805), the current position of the drone (100) is desirably displayed in real time. The display of the map may be switched to or made together with an image of the agricultural field (601) captured by the camera (712) of the drone (100).

The route information display region (806) shows a route that is calculated in advance by the controller, the drone (100), or the agriculture cloud (605) and along which the drone has to fly autonomously. The route is desirably displayed in such a manner as to switch between an image-capturing-only plan or an agrochemical-spreading plan. In addition, in the agrochemical-spreading plan, it is desirable to display one of a route that gives priority to a required time, a route that gives priority to a battery consumption, or a route that gives priority to minimizing omission from chemical agent spreading, and it is desirable to allow a user to select from them. A region where the chemical agent spreading has been finished may be displayed with a different color. It is desirable to display the route together with information concerning positions and sizes of obstacles (electric wire, building, tree, etc.) in the agricultural field that are registered in advance.

The emergency response button (807) is a button for sending an instruction to be issued when an emergency situation such as a failure and a collision of the drone (100) arises; the emergency response button (807) desirably occupies a large part of the main screen (800) (typically one fifth or larger of the entire space of the screen) for prevention of misoperation and for allowing an operator (602) to perform an operation easily in an emergency situation. Actions of the drone (100) in an emergency situation include hovering (pausing on the spot in midair), emergency return to the takeoff-landing point (606), soft landing on the spot, emergency stop of the motors, and the like; the emergency response button (807) is desirably configured to activate one or more of the actions. In the example illustrated in FIG. 8, the hovering is activated by a swiping operation, and the emergency stop of the motors is activated by four consecutive taps; however, other associations between operations and processes may be used. In order to make effective use of the screen space as much as possible, it is desirable that the emergency operation button be made translucent to allow map information behind the emergency operation button to be seen through the emergency operation button. In order not to confuse an operator (nonexpert) in an emergency situation, it is desirable to display, on the emergency operation button, an operation to be performed in an emergency situation in a form of characters, an icon, or a combination thereof. The operation in an emergency situation is desirably an operation that is so simple and unlikely to cause misoperation that an operator will not be confused even the operator is being agitated, such as hitting the button a predetermined times (e.g., four) or more, pressing and holding the button for a predetermined time period (e.g., three seconds) or longer, performing a sliding action on the button, or combinations thereof. The emergency operation button is desirably placed at a sufficient distance (typically one centimeter or longer) from edges of the screen so as to prevent fingers holding a smartphone or a tablet from lying on the button to perform misoperation.

TECHNICALLY ADVANTAGEOUS EFFECTS OF THE PRESENT INVENTION

With the drone controller and the drone control program according to the present invention, it is possible to make it easy for a nonexpert to perform control of a drone that basically performs autonomous flight. In particular, when the unexpected occurs, it is possible to take an emergency response action safely and reliably.

The invention claimed is:

1. A controller for controlling a drone that includes a thrust generating section and performs autonomous flight under computer control, comprising:
    an operation screen of the controller that includes map information on a target area over which the drone is to fly, route information on a route along which the drone is to fly, and an emergency response button for issuing an instruction to take at least any one of actions to the drone, the actions including hovering and stopping the thrust generating section;
    a position detection section that detects a position of the controller; and
    a target area selection screen that is displayed before a transition from a screen to the operation screen is made and on which a specific target area is selected from a plurality of target areas, wherein the controller prohibits selection of a target area at a predetermined or greater distance from the position detected by the position detection section or displays a warning when a target area at the predetermined or greater distance is selected,
    wherein the emergency response button is translucent and is displayed such that the emergency response button is superimposed on a front side of the map information.

2. The controller according to claim 1, wherein a current position of the drone is displayed in a map information display region where the map information is displayed.

3. The controller according to claim 1, wherein the emergency response button occupies one fifth or larger of the operation screen.

4. The controller according to claim 1, wherein a thrust-generating-section emergency stop instruction is sent when a predetermined operation is performed on the emergency response button a predetermined number of times or more within a predetermined time period.

5. The controller according to claim 1, wherein a thrust-generating-section emergency stop instruction is sent when a pressing and holding operation is performed on the emergency response button for a predetermined time period or longer.

6. The controller according to claim 1, wherein the emergency response button is arranged at a position at a predetermined or greater distance from an edge of the operation screen.

7. The controller according to claim 1 wherein the operation screen further includes a button for adjusting an altitude.

8. The controller according to claim 1 wherein the route information includes at least two or more of a route that gives priority to shortening an operating time, a route that gives priority to reducing a battery consumption, and a route that gives priority to uniformizing liquid spreading, from which a route to be used is selectable.

9. The controller according to claim 1, wherein the operation screen includes an aircraft condition display region that displays a current status of the drone, the current status including any one or more of in preparation for flight, during replenishment with liquid, and during takeoff.

10. The controller according to claim 1, wherein the operation screen includes a flight condition display region that displays a flight condition including any one or more of a flight time, a coordinate, a flight speed, and an altitude of the drone.

11. The controller according to claim 1, wherein the operation screen includes a peripheral equipment state display region that displays a peripheral equipment state including any one or more of a remaining battery capacity, a spreading pump condition, a remaining amount of liquid, and a communication condition of the drone.

12. The controller according to claim 1, wherein the operation screen displays information concerning a position and a size of an obstacle registered in advance.

13. A controller for controlling a drone that includes a thrust generating section and performs autonomous flight under computer control, comprising:
   a position detection section that detects a position of the controller;
   an operation screen for controlling the drone, the operation screen including map information on a target area over which the drone is to fly, route information on a route along which the drone is to fly, and an emergency response button for issuing an instruction to take at least any one of actions to the drone, the actions including hovering and stopping the thrust generating section; and
   a target area selection screen that is displayed before a transition from a screen to the operation screen is made and on which a specific target area is selected from a plurality of target areas, wherein the controller prohibits selection of a target area at a predetermined or greater distance from the position detected by the position detection section or displays a warning when a target are at the predetermined or greater distance is selected,
   wherein the emergency response button is translucent and is displayed such that the emergency response button is superimposed on a front side of the map information.

14. A non-transitory computer-readable medium that stores computer-executable commands for controlling a drone that includes a thrust generating section and performs autonomous flight under computer control, the computer-executable commands comprising:
   a command to display map information on a target area over which the drone is to fly;
   a command to display route information on a route along which the drone is to fly;
   a command to display an emergency response button for issuing an instruction to take at least any one of actions to the drone, the actions including hovering and stopping the thrust generating section;
   a command to display, before a transition from a screen to an operation screen is made, a target area selection screen on which a specific target area is selected from a plurality of target areas; and
   a command to prohibit selection of a target area at a predetermined or greater distance from a position detected by a position detection section that detects a position of the controller or to display a warning when a target area at the predetermined or greater distance is selected;
   a command to display the emergency response button such that the emergency response button is translucent; and
   a command to display the emergency stop button such that the emergency stop button is superimposed on a front side of the map information.

15. The non-transitory computer-readable medium according to claim 14, the computer-executable commands comprising a command to display a current position of the drone in a map information display region where the map information is displayed.

16. The non-transitory computer-readable medium according to claim 14, wherein the emergency response button occupies one fifth or larger of a screen.

17. The non-transitory computer-readable medium according to claim 14, the computer-executable commands comprising a command to send a thrust-generating-section emergency stop instruction when a predetermined operation is performed on the response button a predetermined number of times or more within a predetermined time period.

18. The non-transitory computer-readable medium according to claim 14, the computer-executable commands comprising a command to send a thrust-generating-section emergency stop instruction when a pressing and holding operation is performed on the emergency response button for a predetermined time period or longer.

19. The non-transitory computer-readable medium according to claim 14, the computer-executable commands comprising a command to arrange the emergency response button at a position at a predetermined or greater distance from an edge of a screen.

20. The non-transitory computer-readable medium according to claim 14, the computer-executable commands comprising a command to display a button for adjusting an altitude.

21. The non-transitory computer-readable medium according to claim 14, wherein
   the route information includes at least two or more of a route that gives priority to shortening an operating time, a route that gives priority to reducing a battery consumption, and a route that gives priority to uniformizing liquid spreading, and
   the computer-executable commands comprise a command to prompt a user to select a route to be used.

22. The non-transitory computer-readable medium according to claim 14, the computer-executable commands comprising a command to display an aircraft condition display region that displays a current status of the drone, the current status including any one or more of in preparation for flight, during replenishment with liquid, and during takeoff.

23. The non-transitory computer-readable medium according to claim 14, the computer-executable commands comprising a command to display a flight condition display region that displays a flight condition including any one or more of a flight time, a coordinate, a flight speed, and an altitude of the drone.

24. The non-transitory computer-readable medium according to claim 14, the computer-executable commands comprising a command to display a peripheral equipment state display region that displays a peripheral equipment state including any one or more of a remaining battery capacity, a spreading pump condition, a remaining amount of liquid, and a communication condition of the drone.

25. The non-transitory computer-readable medium according to claim 14, the computer-executable commands comprising a command to display information concerning a position and a size of an obstacle registered in advance.

* * * * *